United States Patent [19]

Gawedzinski

[11] 4,159,139

[45] Jun. 26, 1979

[54] DEVICE FOR HOLDING FLEXIBLE BAGS SUCH AS PLASTIC TRASH BAGS AND THE LIKE

[76] Inventor: Norbert L. Gawedzinski, 6800 Foxshire, Florissant, Mo. 63033

[21] Appl. No.: 874,519

[22] Filed: Feb. 2, 1978

[51] Int. Cl.² ............................................. A47F 13/06
[52] U.S. Cl. .................................. 294/55; 294/19 R; 15/257.1; 15/257.7; 248/101
[58] Field of Search ................. 294/55, 19 A, 1 R, 59, 294/51, 52, 57, 59; 15/257.1, 257.3, 257.8; 56/400.11, 400.09; 248/99, 100, 101

[56] References Cited

U.S. PATENT DOCUMENTS

| 3,412,965 | 11/1968 | Alexander | 248/101 |
| 3,733,099 | 5/1973 | Szita | 296/19 R |

Primary Examiner—James B. Marbert
Attorney, Agent, or Firm—Charles B. Haverstock

[57] ABSTRACT

A device for holding and supporting the mouth or open end of a flexible bag such as a plastic trash bag or the like in an open condition, which includes relatively rigid elongated members, one of which is pivotally connected to the other at an intermediate location, projections on the members in position to engage a bag adjacent to the mouth thereof to open the bag mouth, and a device connecting said elongated members operable to maintain the projections engaged with the mouth of the bag under tension to maintain the bag in an open condition. The invention is also characterized by being adjustable for use by left and right handed persons and by being constructed so that the bag can be made to extend in either opposite direction therefrom.

15 Claims, 5 Drawing Figures

U.S. Patent Jun. 26, 1979 4,159,139
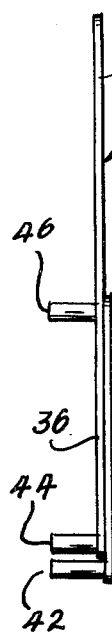
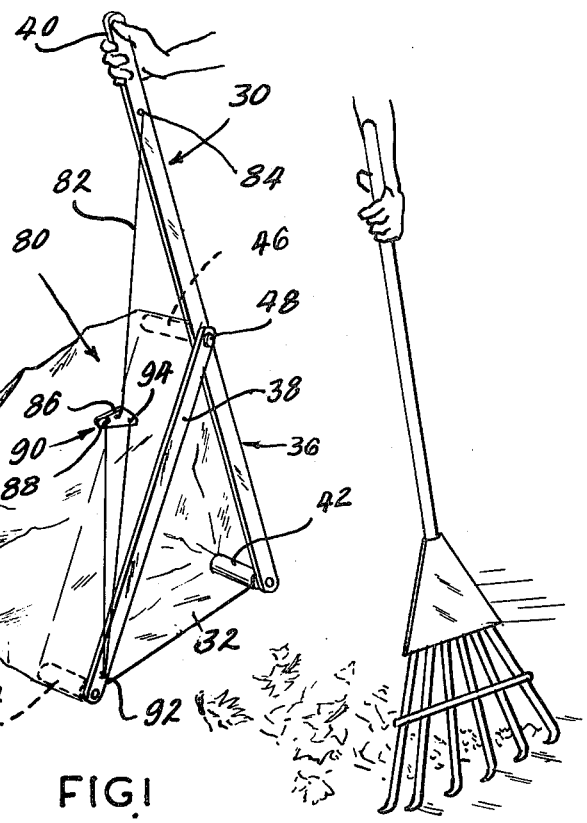
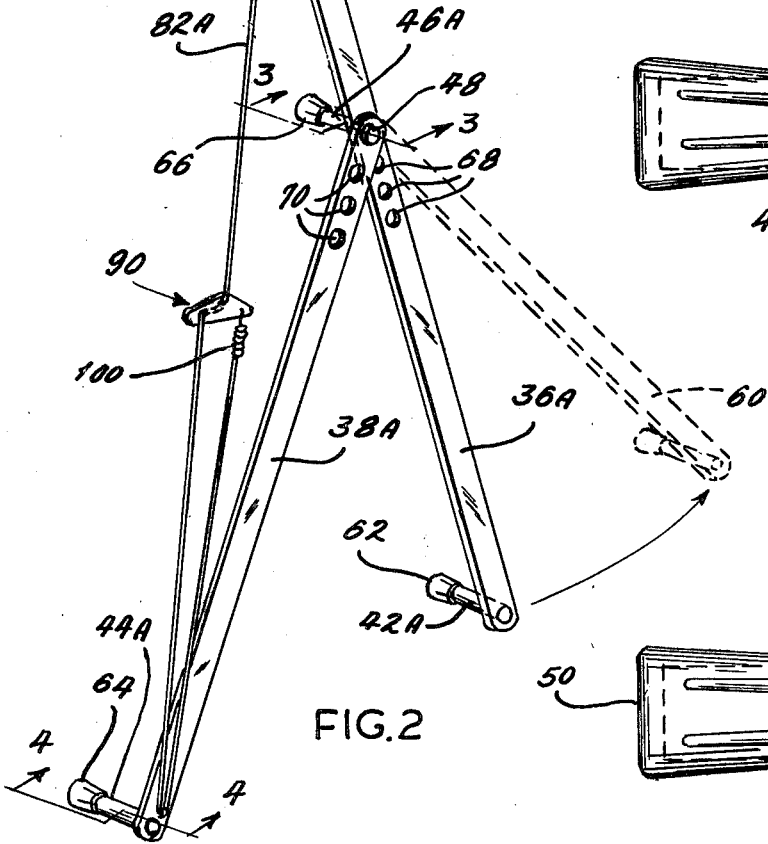
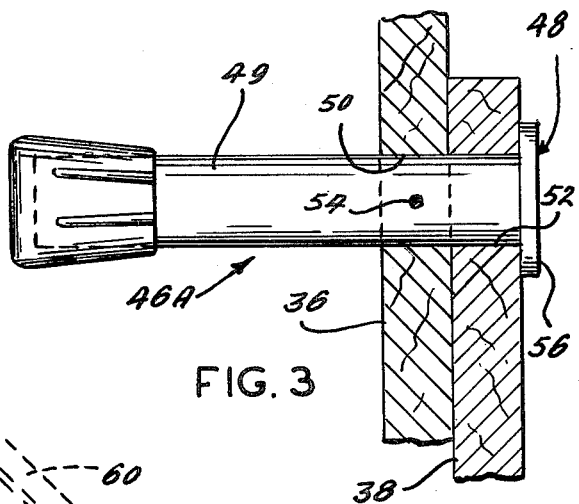
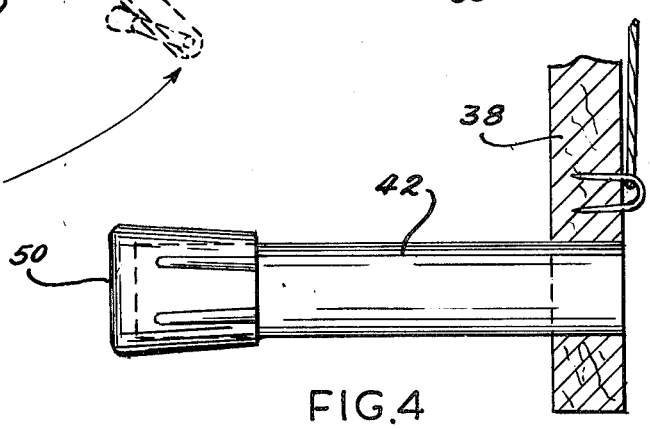

DEVICE FOR HOLDING FLEXIBLE BAGS SUCH AS PLASTIC TRASH BAGS AND THE LIKE

In recent years, especially since the widespread enactment of environmental protection laws prohibiting most on-site burning of leaves and other forms of debris or refuse, flexible trash bags made of plastic and other materials have been commonly employed as a means for collecting and disposing of the debris. Such trash bags have been and are presently manufactured in a wide variety of sizes and shapes, and are usually made of a thin, flexible and flimsy sheet-like material, allowing them to be economically disposed of after once being filled. The flexible and flimsy nature of these bags, however, has posed problems in filing the bags, particularly in filling the bags by raking or sweeping debris into them. For example, for sweeping or raking debris such as leaves, twigs and other matter from lawns, driveways and other places into the bags, it has often been necessary for one person to try to hold the mouth or open end of the bag extended with one hand while attempting with the other hand to rake or sweep the debris into the bag, or alternatively for one person to hold the bag while another does the raking or sweeping. Either of these methods involves considerable stooping and bending, wasted manpower and has other obvious drawbacks including wasted labor.

Several forms of support structures have been proposed for maintaining the mouths of such flexible bags in an open condition whereby debris can be conveniently swept, raked or in some other manner deposited into the bags, but none of the known support structures has been entirely satisfactory. Among other reasons, this is because many of the known structures must be temporarily secured to the ground or other surface from which the debris is to be collected before being used, for example, by driving stakes or some other type anchoring means into the ground. Such anchored support structures are especially difficult to set up and use on relatively hard surfaces such as driveways, streets and other places where leaves and other forms of debris are commonly found, and they present the further disadvantage of frequently requiring the debris to be raked or swept into numerous or large piles to avoid moving it considerable distances over the ground. Others of the known support structures have been transportable, but due to their size have required a lot of bending and stooping when used. In addition, the known support structures for the most part have been relatively complex and costly to manufacture, limited as to the sizes and shapes of bags with which they can be used, and relatively inconvenient to store and package for sale and distribution. Some of the known devices also have been only capable of holding and supporting the bag in a position wherein the mouth of the bag opens upwardly, which means that the debris must be lifted and dropped or otherwise placed in the bag. Typical examples of the known prior art are the support devices disclosed in Schultz U.S. Pat. Nos. 3,697,030; Miller 3,744,081; and Ringer 3,747,653.

The present invention eliminates all of these and other problems and inconveniences previously associated with the filling of flexible trash bags, and includes several forms of a novel device for holding and maintaining the mouth or open end of a flexible trash bag in an open condition advantageous for filling or emptying the bag. The subject device can be used to particular advantage for supporting the mouth of a flexible trash bag in an open condition adjacent to the ground or other surface from which the debris is to be collected, since when used for this purpose it allows the debris to be conveniently swept or raked into the bag with little or no bending or stooping. The subject device can also be used for holding the mouth of the bag in an open condition in other desired positions whereby the debris can be dropped or otherwise deposited into the bag, it can be used for conveniently lifting and carrying the bag, and it can be used to facilitate emptying the bag when full and for numerous other purposes. All of the disclosed forms of the subject device are fully and completely portable, relatively light-weight, and easy to carry. This means that the present device reduces or eliminates the need for raking or sweeping leaves or other forms of debris into piles or for moving the debris considerable distances along the ground before bagging. Also, the subject device requires no ground stakes or any other type of anchoring or ground support means, and therefore can be used to equal advantage in collecting debris from relatively soft surfaces such as lawns as well as from hard surfaces such as driveways, streets or any other surface where it may be found. Furthermore, the subject device can be adjusted to accommodate a wide variety of different sizes and shapes of bags; it is convertable so as to be well suited for use by left or right handed persons; and, it can be collapsed into relatively compact form for packaging and handling or for storage when not being used. The bag can also be attached to extend in either direction from the subject device as by direct attachment or by folding or lapping the mouth of the bag for added support. In addition, the subject device is extremely simple and inexpensive to manufacture. In this respect, several of the disclosed forms of the subject device are susceptible to being made on an assembly-line basis using mass production techniques, and they lend themselves to being packaged for sale on a retail basis in relatively compact, assembled or unassembled form, with and without simple instructions for assembly, if necessary, even by persons with relatively little mechanical skill and/or with few if any simple hand tools. These are important advantages from manufacturing, warehousing and marketing viewpoints.

It is therefore a principal object of the present invention to provide a device for holding the mouth or open end of a flexible bag in an open condition convenient for filling and emptying the bag.

Another object is to provide a device for conveniently holding the mouth of a flexible trash bag in an open condition adjacent to the ground where debris can be swept or raked into the bag with little or no bending or stooping.

Another object is to provide a device for holding and supporting flexible bags, which device is fully and completely portable and therefore eliminates the need for raking or sweeping leaves and other forms of debris into piles before collection thereof.

Another object is to provide a device for holding flexible bags such as plastic trash bags and the like in an open condition, which device can be adjusted to hold bags of different sizes and shapes.

Another object is to provide a simple and inexpensive to manufacture device for holding flexible bags which can be made using readily available materials and manufacturing processes.

Another object is to provide a device for holding the mouth of a flexible trash bag in an open position wherein debris can be conveniently swept or raked into the bag, which device is well suited for use in collecting debris from surfaces such as lawn surfaces as well as from harder surfaces such as driveways, streets and so forth.

Another object is to provide a portable device for holding flexible bags which is light-weight and easy-to-carry and use.

Another object is to provide a device for holding flexible bags which can be made on an assembly-line basis using mass production techniques to reduce the time and labor involved in its manufacture.

Another object is to provide a device for holding flexible bags which is susceptible to being packaged for sale on a retail basis in relatively compact, assembled or unassembled form, along with simple instructions by which it can be quickly and easily later assembled, if necessary, even by a person having little mechanical skill and/or few tools.

Another object is to provide a device for holding flexible bags which is convertible for use by left or right handed persons.

Another object is to provide a device for holding flexible bags which is quick and simple to operate, and from which the bags can be quickly and simply removed when filled.

These and other objects and advantages of the present invention will become apparent after considering the following detailed specification which discloses several embodiments thereof in conjunction with the accompanying drawings, wherein like numerals refer to like parts wherever they occur, and wherein:

FIG. 1 is a perspective view showing one embodiment of the subject device in an operative condition holding and maintaining the mouth of a flexible bag in an open position wherein leaves and other forms of debris can be conveniently swept, raked or otherwise put into the bag;

FIG. 2 is a perspective view showing another embodiment of the present invention;

FIG. 3 is a cross-sectional view taken on line 3—3 of FIG. 2;

FIG. 4 is an enlarged, fragmentary, cross-sectional view taken on line 4—4 of FIG. 2;

FIG. 5 is a side elevational view of the device of this invention shown in collapsed condition.

Referring to the drawings more particularly by reference numbers, number 30 (and 30A) in FIGS. 1 and 2 identify different embodiments of a device for holding the mouth or open end of a flexible bag such as a plastic trash bag or the like in an open condition, which devices are constructed according to preferred forms of the present invention. In FIG. 1, the device 30 is shown in an operative condition supporting mouth 32 of a typical trash bag 34 in a manner such that leaves, twigs and other forms of lawn and surface debris can be conveniently swept or raked into the bag. This is a particularly advantageous application of the subject device since the device is constructed to eliminate most, if not all, need for bending or stooping when filling or emptying the bag. It will be recognized, however, that the subject device can also be used for supporting the bag in a suspended condition so that the debris can be lifted and dropped or otherwise deposited into the bag, and it can be used for lifting and carrying the bag and to facilitate emptying the bag when necessary and for numerous other purposes.

As shown in FIGS. 1 and 5, the subject device 30 includes a hingedly connected pair of elongated, relatively rigid members such as members 36 and 38. The members 36 and 38 may be made of various materials, including wood, plastic, aluminum and so forth, but should preferably be relatively light-weight members to reduce the overall carrying weight of the device. An extension 40 of the member 36 serves as a handle for carrying or otherwise moving the device, and can also be used to maintain the device in an upright position. It should be noted that the handle portion 40 of the subject device is relatively long compared to the overall longitudinal dimensions of the device, the length being chosen for convenience. Furthermore, when the device 30 is oriented in an upright manner, the handle portion 40 extends upwardly to a considerable distance above the ground and generally at an inclination relative to the ground. These features are important as they allow persons of various heights to conveniently grasp and hold the handle portion 40 and to support and manipulate the device in the upright manner without bending or stooping. However, when debris is to be collected it may not always be necessary to use the handle portion 40 to support the device in an upright position. This is because the device 30 has projections or peg members 42 and 44 attached near the free or unattached ends of the respective members 36 and 38 which extend sidewardly therefrom. The pegs 42 and 44 are primarily for engaging the bag but they may also extend sidewardly a sufficient distance to support the device 30 in an upright manner independently of the operator. This is especially possible if the device is used on a flat surface such as on driveways, streets, sidewalks and the like. Also, the pegs 42 and 44 may be weighted or constructed of relatively heavy material such as iron to add stability and render the device even better able to be free standing. The projection members 42 and 44, together with a third projection member 46 which is located at or near where the members 36 and 38 are hinged, are the means provided on the present construction that engage the bag 34 and support the mouth thereof in a triangularly shaped open condition. The members 42, 44 and 46 can have various sizes and shapes several of which are shown and they can have different lengths as desired.

The member 38 is pivotally connected adjacent to one of its ends to an intermediate location on the member 36 as by pivot means 48. This means that when the device 30 is being used to engage a bag, the elongated member 38 is positioned extending at an angle relative to the elongated member 36, the angular extension depending on the spacing of the members 42, 44 and 46 and the size of the mouth 32 of the bag engaged thereby. In this position the pegs 42, 44 and 46 form three corners of a triangle which is adjustable to spread the mouth of the bag 34 and hold it open. This also means that a given size of the present device is adjustable to accommodate a relatively wide range of bag sizes. Also by having the portion of the bag mouth that extends between the pegs 42 and 44 relatively straight when being held open this reach of the bag mouth can be relatively easily maintained close to the ground or other surface to facilitate sweeping debris into the bag. This is especially desireable because it means that a fairly long reach of the bag is close to the ground thereby making sweeping into the bag relatively easy.

One form of the pivot means 48 provided for attaching the member 38 to the member 36 is shown in FIG. 3, and includes a cylindrical peg or dowel member 49 which extends through a hole 50 in the elongated member 36 (or 38) transversely with respect to the longitudinal dimension of the members at the location indicated with the diameter of the hole 52 in the member 38 being slightly larger than the diameter of the peg 49 to allow free pivotal movement of the member 38 thereon. Also, in the preferred construction, the elongated member 36 is shown fastened to the peg 49 by means of a nail, screw or like member such as by nail 54 (FIG. 3). The peg member 49 is also provided with a stop member such as disc 56 which can be glued or otherwise attached to the end of the peg member 49 to hold the members together. The form of the pivotal connection means 48, as disclosed, is only one of many possible ways to pivotally connect the members 36 and 38 and is preferred because of its simplicity. Other forms of pivotal connection means which can also be satisfactorily used for this purpose, if desired, include hinge type devices as well as other types of journaling means.

The intermediate location where the member 38 is pivotally connected to the member 36 is preferrably chosen so as to enable the members 36 and 38 and the pegs 42, 44 and 46 all to be placed in alignment with each other as clearly shown in FIG. 5. Such a construction, also enables the member 38 to be pivoted in either opposite direction from the aligned position as indicated in FIG. 2 by the solid outline in one condition and by the dotted outline 60 in the other. Being able to position the elongated members 36 and 38 in alignment with each other as shown in FIG. 5 is important as it will allow the device 30 to be collapsed to a relatively compact form when not being used so that it can be conveniently handled, packaged, shipped and stored. In the collapsed condition the device occupies relatively little space and simplifies packaging and reduces the store space required to display and store the devices. Furthermore, connecting elongated members 36 and 38 together so that the member 38 can be pivoted to positions angularly related to the member 36, and on either opposite side thereof, allows the device 30 (or 30A) to be readily converted for use by either right or left handed persons. For example, in FIG. 2 the device is shown in solid outline in the arrangement in which it would be normally used by a right handed person and in dotted outline (60) in the arrangement in which it would normally be used by left handed persons. In either of these arrangements it should be noted that the handle portion 40 or 40A of the device 30 or 30A will extend upwardly at a convenient angular inclination offset from the vertical and toward the body of a user, thereby making it convenient to grasp and to manipulate. Each of the peg members 42A, 44A and 46A is preferably provided with means such as rubber-like cup members 62, 64 and 66 to improve its ability to engage and hold a bag and to prevent the bag from sliding off the peg members 42A, 44A and 46A after once being positioned thereon.

All of the peg members 42, 44, 46, 42A 44A and 46A may be made from light weight materials such as wood, aluminum, iron alloys or various plastics. If desired, however, the peg members can be constructed of heavier materials such as iron in rod or pipe form to make the device better able to be free standing. The length of lower peg members 42, 44, 42A and 44A can also be made to be longer than the upper peg member 46 and 46A for the same reason. The length of projections or pegs may vary but they must be long enough to engage and hold the open end of the bag. As indicated, they may also be made to be long enough to maintain the device with and without the bag attached thereto in a free standing position. Thus, the lower pegs may vary in length from a few inches up to as much as a foot or longer.

The support members 36, 38 and 36A and 38A can be constructed of many well known materials. Wood is preferred because it is light-weight and relatively inexpensive. Other suitable materials are aluminum, iron alloys, plastics such as the polyvinylchlorides, polyolefins such as polyethylene, polycarbonates and reinforced plastics such as reinforced nylon. The cross-sectional shape of the support members may also vary such as by being square, rectangular, eliptical, oblong, and round as well as any other shape which is convenient for the manufacture of the elements, and the members can be made to be of hollow or tubular construction.

The length of the support members may be any desired length useful for the average person and for convenience in storing. The main support elements identified in the drawings as 36 and 36A will normally be between about 3 to 3½ feet in length and the companion elements 38 and 38A will generally be about half as long as the main support element. One or both of the support elements may also have additional holes such as the holes 68 and 70 in order to change the location of the pivot point to accommodate still different bag sizes. The device can also be made in much larger and much smaller sizes as well.

The trash bags for use with the present device may be made from any conventional material. Disposable bags made from polyolefins such as polyethylene and polypropylene, polyvinylchloride, reinforced paper, nylon, canvas, and other known materials are readily available and can be used. The bags may be of imperforate sheet material or in the form of webs or nets.

A tensioning device 80 (FIG. 1) is provided to lock the members 36 (or 36A) and 38 (or 38A) in a predetermined angular orientation whereby the pegs 42, 44 and 46 (42A, 44A, 46A) engage the mouth of the bag 34 and maintain the bag under tension in an open condition. The form of the tensioning device 80 shown in FIG. 1 includes a cord member 82 which is anchored to the handle portion 40 of the member 36 by suitable means such as by an eyelet, a staple, or other suitable means 84. The length of cord 82 that is attached to the handle portion 40 extends through two spaced holes 86 and 88 of a three hole slide locking device 90 and from there extends to another anchoring means 92 located near the free end of the member 38. From there the cord 82 extends back through a third hole 94 in the locking device 90 and both opposite ends of the cord 82 are knotted to prevent them respectively from sliding through the holes 94 and the anchoring means 84. In order to lock the device to maintain the bag engaged with the pegs 42, 44 and 46 under tension it is simply necessary to slide the locking device 90 along the cord 82 while drawing the looped portion of the cord through the lower anchoring means 92 adjacent to the free end of the member 38. When the desired tension is obtained in this way the locking device 90 is released and the tension will remain to hold the bag open. Other forms of tension applying or locking means can also be used including the use of devices such as resilient members such as rubberbands, springs, such as spring 100 shown in FIG. 2, and other similar means, although the use of a cord and a slide locking device such as described above has certain advantages in simplicity, ease of operation, and cost of manufacture. Also, the locking device 90 is relatively easy to release when one desires to remove the bag from engagement with the pegs 42, 44 and 46.

Also within the concept of this invention would be a device wherein leg 38 would have an extension similar to extension or handle portion 40 on the leg 36 to form a construction that is X shaped. In such a case, a tensioning device could be located on either or both sides or between the two upwardly extending handle portions.

It is also contemplated to install the bag on the device by inserting the mouth of the bag between the members of the bag 36 and 38 where the members are angularly oriented and from the side of the device opposite from the pegs 42, 44 and 46. Then by reverse folding the bag edge, the folded back bag portion can be placed around the pegs 42, 44 and 46 so that the bag mouth actually extends on both sides of the pegs. This may make for a better grip on the bag for lifting and filling purposes.

Also the construction of the pegs themselves can be varied considerably. For example, the pegs shown in FIG. 1 are cylindrical in shape with their other surfaces preferably roughened or coated with an abrasive or high friction material to increase their holding power on the bag. The pegs shown in FIGS. 2-4 on the other hand are shown as wooden pegs or like members such as might be cut from dowel stock and they have rubber or rubber-like cups, attached to the ends thereof to improve their bag gripping ability.

While the present invention has been described in connection with particular embodiments thereof it is understood that those skilled in the art may make many changes and modifications without departing from the true scope and spirit of this invention. The claims are intended to cover all embodiments of this invention.

I claim:

1. A device for maintaining the mouth of a flexible bag such as a flexible trash bag or the like in an open condition comprising a pair of elongated relatively rigid members, means pivotally connecting one of said pair of members to the other of said pair at an intermediate location on said other of said pair of members, bag engaging means projecting sidewardly from said members at spaced locations thereon, said bag engaging means being engageable with the bag adjacent to the mouth thereof and being movable to open the bag mouth when the said pair of elongated members are pivoted relative to each other to an angularly related position, and tension means extending between spaced locations on said pair of elongated members, said tension means including an elongated flexible member and means for tensioning said flexible member to maintain said pair of relatively rigid members in an angularly related position with the sidewardly projecting means engaged under tension with the bag adjacent to the mouth thereof.

2. The device defined in claim 1 wherein said other of said pair of relatively rigid members includes a handle portion.

3. The device defined in claim 1 wherein said means projecting sidewardly from said pair of elongated members include three spaced peg members and means forming a relatively high friction surface on said peg members.

4. A device for maintaining an open end of a flexible bag such as the open end of a plastic trash bag or the like in an open condition comprising first and second elongated relatively rigid members each having spaced opposite ends, means for pivotally connecting one end of said first member to an intermediate location on said second member, peg means projecting sidewardly from each of said members, said sidewardly projecting peg means being located at spaced positions along the respective members to engage the bag adjacent to the open end at spaced locations and to support the open end of the bag in an extended polygonal configuration when said first member is pivoted to a predetermined orientation relative to said second member, and other means connected between locations on the respective first and second members spaced from the location of said pivotally connecting means, said other means including means for holding said members in predetermined angular orientation when said sidewardly projecting peg means are positioned in engagement with the bag under tension to maintain the open end of the bag in an open configuration, said other means including an elongated member connected between spaced locations on said first and second members and means associated with the elongated member to adjust the length of the reach of the elongated member that extends between the first and second members.

5. The device defined in claim 4 wherein said first member is movable to positions angularly related to said second member on either opposite side thereof.

6. The device defined in claim 4 wherein said peg means are located near the other of the opposite ends of said first member and adjacent one of the opposite ends of said second member.

7. The device defined in claim 4 wherein said first member is pivotally connected to said second member at a location such that said first member can be moved to an inoperative position in alignment with said second member.

8. The device defined in claim 4 wherein said sidewardly projecting peg means include three spaced and substantially parallel members extending from the first and second members.

9. Means for maintaining the mouth of a plastic bag opened under tension comprising a first elongated member having a pair of spaced sidewardly extending members attached thereto, a second elongated member, shorter than the first elongated member, means hingedly connecting said second elongated member adjacent to one end thereof to the first elongated member at an intermediate location therealong, a sidewardly extending member on said second elongated member adjacent to the free end thereof, said second elongated member being movable angularly relative to the first elongated member so that when the sidewardly extending members thereon are positioned extending into the mouth of a flexible bag they open the bag mouth, and flexible means including a flexible member connected between spaced locations on the first and second elongated members, said flexible means including means to tension the flexible member when the sidewardly projecting members are engaged with the bag to retain the bag in an open condition.

10. The means defined in claim 9 wherein the second elongated member is movable to a position aligned with the first elongated member.

11. The means defined in claim 9 wherein the sidewardly extending members include means to frictionally engage the bag.

12. The means defined in claim 9 wherein the first and second elongated members are formed of wood and the sidewardly extending members are pegs with high friction surface characteristics.

13. The means defined in claim 9 including means on one of said members to relocate the means hingedly connecting said first and second elongated members.

14. A device for maintaining the mouth of a flexible bag such as a flexible trash bag or the like in an open condition comprising a pair of elongated relatively rigid members, means pivotally connecting one of said pair of members to the other of said pair at an intermediate location on said other of said pair of members, bag engaging means projecting sidewardly from said members at spaced locations thereon, said bag engaging means engageable with the bag adjacent to the mouth thereof and being movable to open the bag mouth when the said pair of elongated members are pivoted relative to each other to an angularly related position, and tension means extending between spaced locations on said pair of elongated members, said tension means including a cord and a cord locking member to maintain said pair of relatively rigid members in an angularly related position with the sidewardly projecting means engaged under tension with the bag adjacent to the mouth thereof.

15. A device for maintaining an open end of a flexible bag such as the open end of a plastic trash bag or the like in an open condition comprising first and second elongated relatively rigid members each having spaced opposite ends, means for pivotally connecting one end of said first member to an intermediate location on said second member, peg means projecting sidewardly from each of said members, said sidewardly projecting peg means being located at spaced positions along the respective members to engage the bag adjacent to the open end at spaced locations and to support the open end of the bag in an extended polygonal configuration when said first member is pivoted to a predetermined orientation relative to said second member, and other means connected between locations on the respective first and second members spaced from the location of said pivotally connecting means, said other means including flexible means for holding said members in predetermined angular orientation when said sidewardly projecting peg means are positioned in engagement with the bag under tension to maintain the open end of the bag in an open configuration, said flexible means including a flexible cord, and locking means slideably associated with said cord and movable therealong to adjust the reach of the cord extending between the first and second members.

* * * * *